Oct. 24, 1933.  S. G. SHORT ET AL  1,931,512
APPARATUS FOR USE IN COLOR CINEMATOGRAPHY
Filed Aug. 8, 1931  2 Sheets-Sheet 1
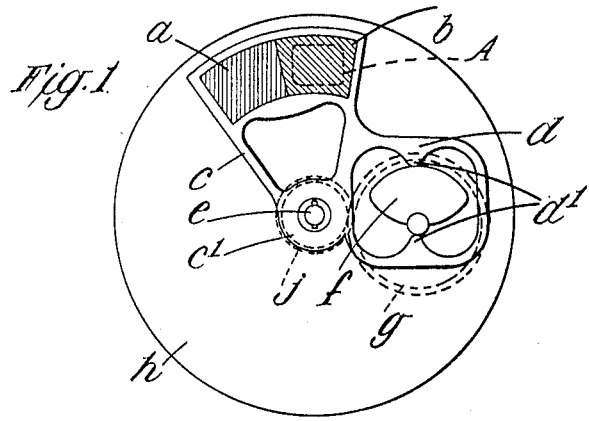
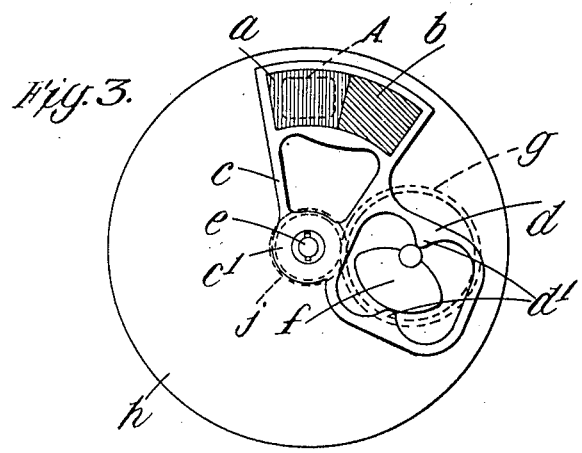
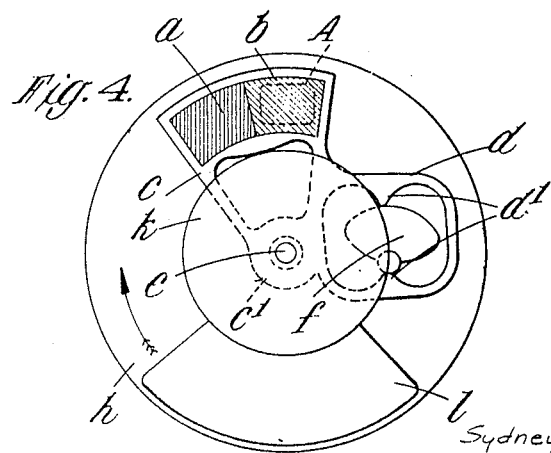
Sydney George Short
Juliet Evangeline Williams
INVENTORS

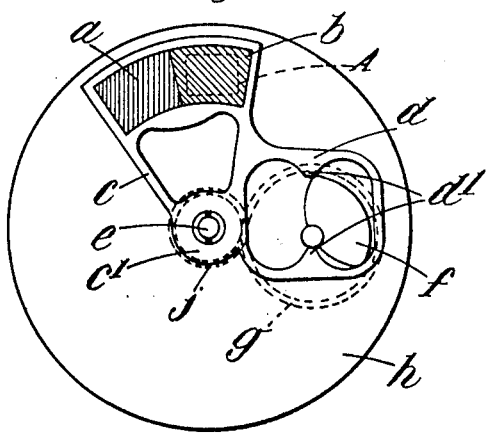
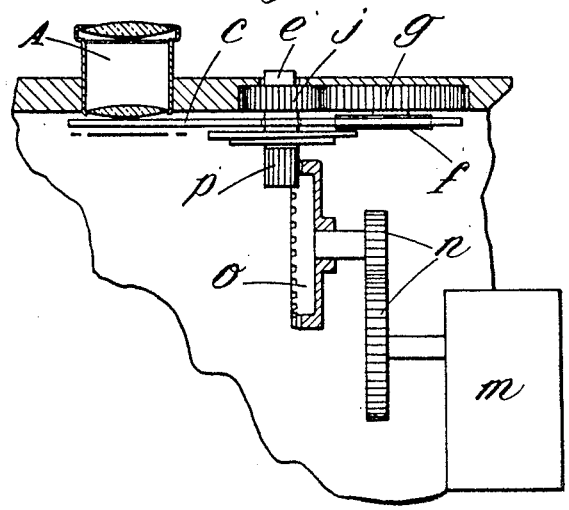

Patented Oct. 24, 1933

1,931,512

UNITED STATES PATENT OFFICE 1,931,512

APPARATUS FOR USE IN COLOR CINEMATOGRAPHY

Sydney George Short, Willesden, London, England, and Juliet Evangeline Williams, Pontyclun, South Wales Application August 8, 1931, Serial No. 555,915, and in Great Britain October 2, 1930

1 Claim. (Cl. 88—164)

This invention relates to certain improvements in mechanical movements as applied to motion picture apparatus and has for its object to provide a new mechanical movement for converting rotary into reciprocatory motion, the movement of the reciprocated member being such that it is held stationary for comparatively long periods at the end of each reciprocation and is moved sharply from one extreme position to the other.

The mechanical movement, according to the present invention, comprises essentially a pivoted cam ring surrounding a cam and having inward projections which are adapted to bear on the cam to hold the cam ring stationary, and the sides of which are adapted to be engaged by the leading edge of the cam to cause reciprocation of the cam ring. The cam is driven from any suitable rotary source and the member which it is desired to reciprocate and to hold stationary at the ends of the reciprocations is attached to or formed in one with the cam ring.

The present invention is particularly applicable to cameras for taking exposures for two-color cinematography, for it may then be used to cause reciprocation of the filter carrier which may, by means of the mechanism according to this invention, be reciprocated sharply from one extreme position to the other, while the film is being moved, and may be held stationary while the exposure is being taken, thus enabling a sharper image to be obtained.

The mechanical movement, according to this invention, is not limited to its use in a photographic camera, but in order that the nature of this invention may be more fully understood, we have illustrated in the accompanying drawings, by way of example only, its embodiment in a camera, since this is a particularly advantageous embodiment.

In the accompanying drawings,

Figure 1 is a rear view of the front portion of a camera embodying new mechanical movement, according to this invention, to cause reciprocation of the filter carrier.

Figure 2 is a similar view showing the cam about to cause reciprocation of the filter carrier, and Figure 3 is also a similar view showing the position of the parts after the reciprocation has been completed.

Figure 4 is a view similar to Figure 1 showing the shutter in position, and

Figure 5 is a sectional view showing the driving mechanism.

Referring now to the drawings, the member to be reciprocated comprises a filter carrier $c$ having filters $a$ and $b$. The member $c$ is freely pivoted at its apex $c^1$ on the shutter spindle $e$ of the camera. The new mechanical movement, according to this invention, is in part integral with the member $c$ to be reciprocated, and comprises a cam ring $d$ which is somewhat of rectangular form having rounded corners and also has small projections $d^1$ at or near the centre of the top and bottom thereof, these projections $d^1$ extending into the cam ring, as shown. Rotatably arranged within this cam ring is a cam $f$ in the form of 120° sector carried by a gear wheel $g$ which is sunk into the front plate $h$ of the camera and gears with a small gear wheel $j$ secured to the shutter spindle $e$ behind the filter carrier. $k$ is the shutter disc and $l$ is the shutter blade.

Referring now to Figure 5, the motive power is derived from a motor $m$ (spring or otherwise) which drives through gearing $n$, a crown wheel $o$, which in turn drives a pinion $p$, secured on the shutter spindle $e$.

It will be seen that as the shutter $l$ is rotated, the cam $f$ will be revolved, and by reason of engaging with the cam ring $d$ will rock the filter carrier $c$ so as to bring the filters $a$ and $b$ alternately behind the lens aperture A. When the cam $f$ contacts with the small inward projection $d^1$, (the positions shown in the drawings), however, the filter carrier $c$ will be held stationary, due to the outer edge of the cam $f$ being circular with respect to the spindle of the gear wheel $g$. It is during this stationary period of the filter carrier that the shutter opens the lens to give an exposure. It will be seen that the cam will rotate at half the speed of the shutter and furthermore that, in addition to giving a sharp and definite change-over to the filter carrier, will maintain the same stationary during a long period of rest in order to give an adequate exposure.

As soon as the following edge of the cam $f$ leaves one projection $d^1$, the leading edge will engage with the side of the other projection $d^1$ and, as shown in Figure 2, will rock the filter carrier $c$.

The periods of rest enable the alternate colored filters to be held stationary between the lens and the shutter during the exposure. The holding of the filters stationary during the exposure affords the advantage over a constantly rotating filter that sharper definition is obtained.

It will thus be seen that by means of the present invention the rotary movement of the shutter spindle $e$ is converted into a reciprocatory movement of the filter carrier c, this reciprocatory movement being such that the filter carrier is held stationary at the extreme positions and is sharply reciprocated from one extreme position to the other.

The new mechanical movement for converting rotary into reciprocatory movement, according to the present invention, has many other applications than that particularly specified above, as will be obvious, and it will further be apparent that the member to be reciprocated may be formed integral with or attached to the cam ring and the rotary power applied to the cam f may be derived from any suitable source.

We claim:—

In a camera for taking exposures for two-color cinematography, a shutter shaft, means for rotating said shutter shaft, a shutter secured to said shaft and arranged behind the lens, a filter carrier disposed between said shutter and said lens, a cam ring connected to said filter carrier and pivoted on said shutter shaft, a cam within said cam ring, means for rotating said cam from the shutter shaft, said cam having one face concentric with the axis of rotation, two inward projections oppositely disposed within said cam ring and bearing on the cam to hold the filter carrier stationary, said projections being at their sides adapted to be engaged by the leading edge of the cam to cause reciprocation of the cam ring.

SYDNEY GEORGE SHORT.
JULIET EVANGELINE WILLIAMS.